(No Model.) 2 Sheets—Sheet 1.

W. C. JONES.
BROOM RACK OR HOLDER.

No. 464,176. Patented Dec. 1, 1891.

Witnesses:
Chas. H. Ourand
W. S. Duvall

Inventor
Wesley C. Jones
By his Attorneys,
C. A. Snow & Co.

(No Model.) 2 Sheets—Sheet 2.

W. C. JONES.
BROOM RACK OR HOLDER.

No. 464,176. Patented Dec. 1, 1891.

Witnesses:
Chas. H. Ourand
W. S. Duvall

Inventor
Wesley C. Jones,
By his Attorneys,
C. A. Snow & Co.

THE NORRIS PETERS CO., PHOTO-LITHO., WASHINGTON, D. C.

United States Patent Office.

WESLEY C. JONES, OF WARRENSBURG, MISSOURI.

BROOM RACK OR HOLDER.

SPECIFICATION forming part of Letters Patent No. 464,176, dated December 1, 1891.

Application filed May 14, 1891. Serial No. 392,752. (No model.)

*To all whom it may concern:*

Be it known that I, WESLEY C. JONES, a citizen of the United States, residing at Warrensburg, in the county of Johnson and State of Missouri, have invented a new and useful Broom Rack or Holder, of which the following is a specification.

This invention relates to broom racks or holders; and the objects in view are to provide a cheap and simple device for supporting overhead a stock of large and small brooms and brushes, to so construct the device as to be durable and not liable to become broken during shipment or by a fall, and to support the brooms in a convenient manner for handling and inspecting, and, furthermore, to provide means for raising and lowering the rack and locking the same securely in either position and at a proper height.

Various other objects and advantages of the invention will appear in the following description, and the novel features thereof will be particularly pointed out in the claims.

Figure 1:
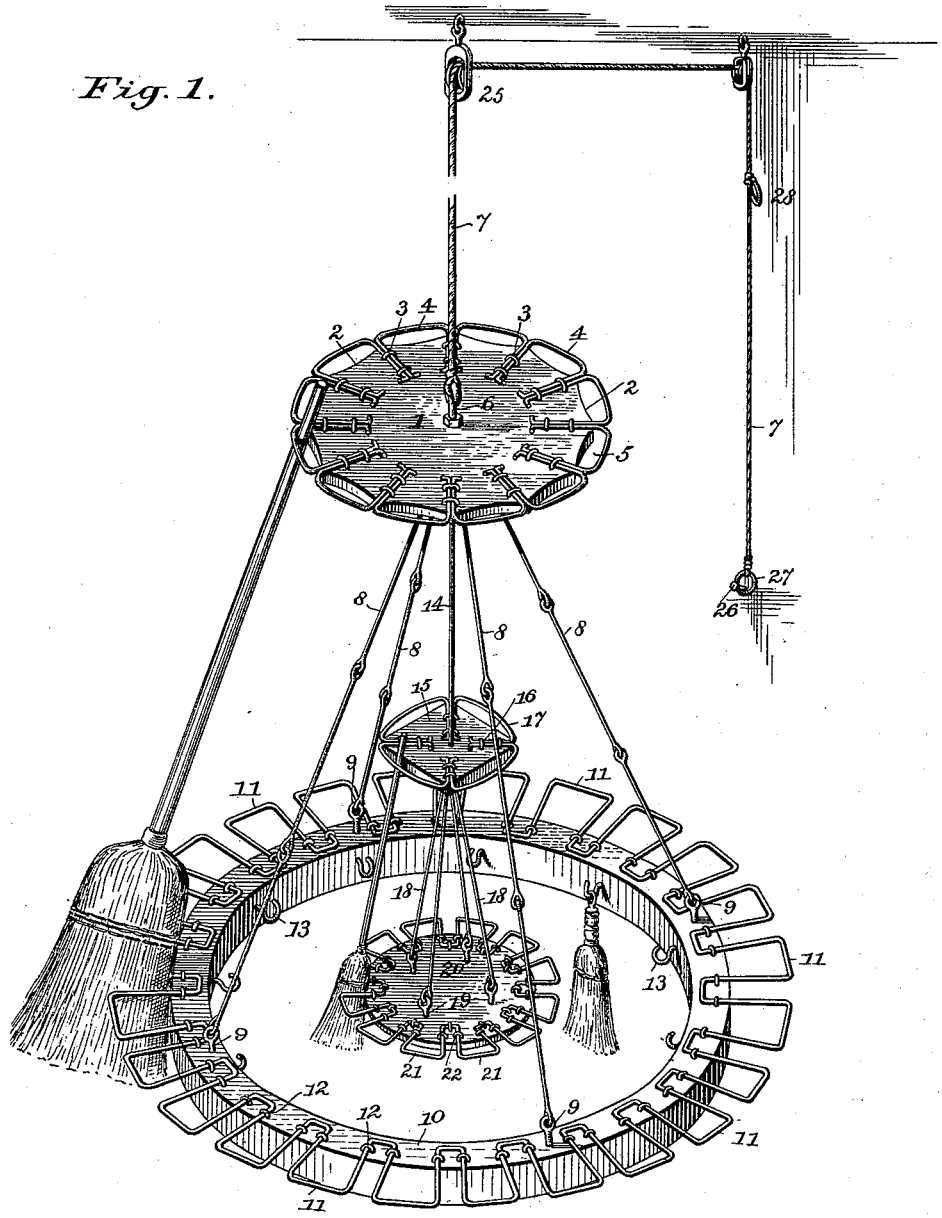
Figure 2:
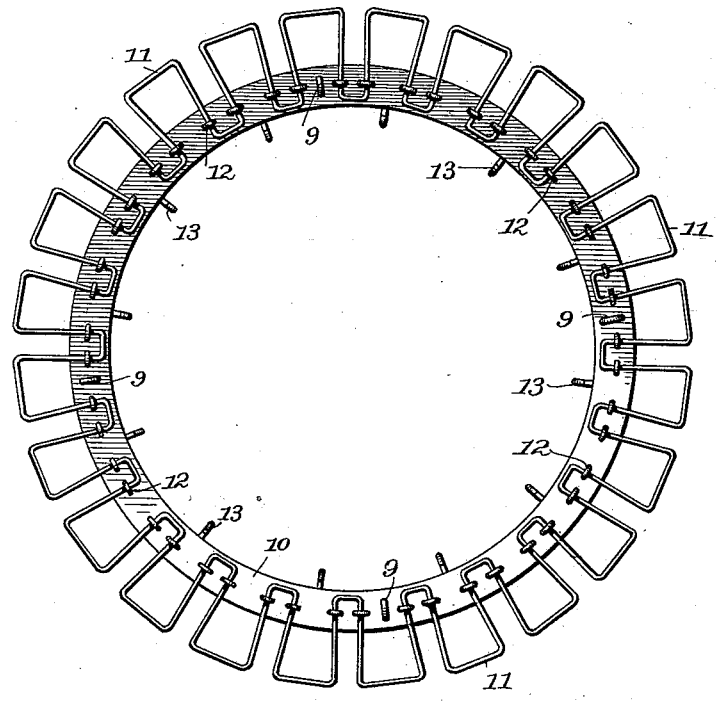
Figure 3:
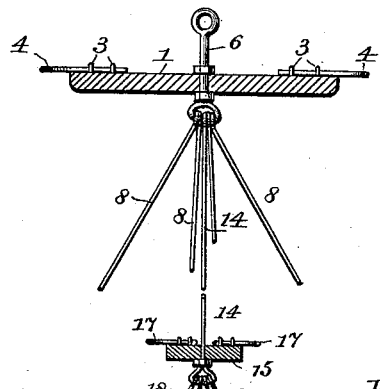

Referring to the drawings, Figure 1 is a perspective of a broom-rack constructed in accordance with my invention. Fig. 2 is a detail in plan of the lower ring. Fig. 3 is a detail in transverse section of the upper main head or disk.

Like numerals of reference indicate like parts in all the figures of the drawings.

In practicing my invention I provide a polygonal-shaped upper head or disk 1, the faces of which are curved, as at 2, and secured to the upper side of the disk by a series of staples 3, and opposite each of the faces of the disk is a wire loop 4, which combines with one of the curved faces to form a broom-handle-receiving opening 5, of which there is a series. Through the center of the disk or main upper head 1 is passed a swiveled eyebolt 6, in the upper eye of which is adapted to be secured a suspension-rope 7. To the lower eye of the eyebolt is connected a series of light wire chains 8, which chains diverge and are each connected to an eye 9, projecting upwardly from the upper side of a lower base-ring 10. The base-ring 10 is provided with a series of radiating broom-embracing arms 11, formed by a continuous wire bent in zigzag form, as shown, and fastened by staples 12 to the face of the wooden base-ring 10. The inner periphery of the base-ring is studded with hooks 13, which staples are designed to engage with the suspension-cords of whisk brooms.

From the eye 6 of the main upper disk or head depends loosely a suspension-rod 14, which rod passes through and terminates in an eye below a small disk 15, polygonally faced and carrying wire loops 17, secured by staples 16, said loops corresponding to the loops 4 of the upper disk 1. From the lower end or eye of the suspension-rod 14 depends a series of hanger-rods 18, the lower ends of which connect with eyes 19, secured to a small lower disk 20. This disk is provided with a series of broom-embracing spring-arms 21, which correspond with the arms 11 of the base-ring, being formed of a continuous piece of wire bent in zigzag form and connected by staples 22.

The suspension-rope 7 is passed over a suspension-pulley 25, secured to the ceiling of the store in which the rack is to be located and from thence along the wall of the store a suitable distance. A nail or other securing device 26 is inserted in the wall at a suitable height, and a ring 27 is secured to the lower end of the cord, said ring engaging with the nail when the rack is lowered to a position in which the broom may be readily withdrawn and inspected. The cord is also provided above the ring 27 with an upper ring 28, also designed to engage the nail, and when in such engagement the rack will be in its most elevated position and sufficiently high to clear the heads of any customers that may come in the store, even though they be unusually tall. By thus proportioning the suspension-cord and the location of the ring relative to each other I am enabled to quickly and easily adjust the rack either to a proper lowered position or a position of sufficient height, and for such purpose require no chair, step-ladder, box, or other elevated platform to mount upon for the purpose of drawing down the rack, so that employés of various heights may most readily operate the device.

In operation a series of large brooms have the upper ends of their handles projected upwardly through the wire loops 4, while their brush portions are inserted sidewise between the spring-arms 11 of the base-ring. In the same manner are small or children's brooms mounted in the disks 15 and 19, and with an accompaniment of whisk brooms depending from the hooks it will be seen that a complete stock may be supported in position for use.

Having described my invention, what I claim is—

1. The herein-described broom-rack, the same consisting of an upper disk having broom-handle-receiving loops, suspension devices depending from the upper disk, an open base-ring suspended therefrom, upper and lower smaller disks, also suspended from the main upper disk, within the base-ring, broom-embracing spring-arms mounted on the base-ring and the lower disk, and handle-receiving loops mounted on the upper disk, substantially as specified.

2. The herein-described broom-rack, consisting of the main upper disk, the series of radial loops, the lower base-ring having the series of pairs of spring-arms, eyes mounted on the base-ring, a swiveled eye mounted in the main upper disk, chains connecting the same with the eyes of the ring, a rod suspended from the swiveled eye, a disk mounted thereon, said rod terminating below the disk in an eye, suspension-rods depending from the eye, loops mounted on the upper disk, and spring-arms mounted on the lower disk, substantially as specified.

In testimony that I claim the foregoing as my own I have hereto affixed my signature in presence of two witnesses.

WESLEY C. JONES.

Witnesses:
MAX PETHICK,
J. R. WHITE.